United States Patent Office 3,558,790
Patented Jan. 26, 1971

3,558,790
ANIMAL FEED COMPOSITIONS AND METHODS
Gino J. Marco, Webster Groves, Mo., assignor to Monsanto Company, St. Louis, Mo., a corporation of Delaware
No Drawing. Filed Oct. 23, 1967, Ser. No. 677,083
Int. Cl. A61k 27/00
U.S. Cl. 424—356                                          11 Claims

ABSTRACT OF THE DISCLOSURE

Animal feed compositions containing at least one growth-promoting compound selected from the group consisting of saturated and mono- and polyolefinically unsaturated monocycloaliphatic hydrocarbons of at least 6 and not more than 20 carbon atoms.

---

This invention relates to animal feed compositions and to methods of improving growth response in animals.

In accordance with the present invention, it has now been found that certain mono- and polyolefinically unsaturated monocycloaliphatic hydrocarbons (hereinafter referred to as "cyclic hydrocarbons" for the sake of brevity) are useful growth promoters for animals. Animal diets containing the cyclic hydrocarbons elicit a substantially greater weight gain and feed efficiency response in animals than when said diets are used alone. The growth promoting compounds are also useful for the improvement of carcass quality in cattle as manifested by increased marbling.

The improved weight gain and feed efficiency response in animals is accomplished in accordance with this invention by a method which comprises administering to the animal a growth-promoting amount of at least one compound selected from the group consisting of saturated and mono- and polyolefinically unsaturated monocycloaliphatic hydrocarbons of at least 6 and not more than 20 carbon atoms.

The compounds of the above formula are useful in animal feeds generally, for example, poultry, swine and ruminant feeds, but they are particularly advantageous when employed in ruminant feeds for cattle and sheep.

The value of animal feeds generally has been determined directly by feeding the animal. Within the past few years, however, the in vitro rumen technique whereby the changes occurring in feeds brought about by microorganisms are measured more readily and with great accuracy has been employed more frequently in the evaluation of animal feeds. This technique involves the use of an apparatus in which the digestive processes of the animals are conducted and studied in vitro. The animal feeds, rumen inoculum and various growth promotants are introduced into and withdrawn from a laboratory unit under carefully controlled conditions and the changes taking place are studied critically and progressively during the consumption of the feed by the microorganisms. The results obtained by use of the aforesaid transplanted rumen technique have been confirmed in vivo by actual feeding of animals.

Several parameters have been employed in the in vitro test methods to determine the effectiveness of the active growth promoting material. The parameter employed in evaluating the cyclic hydrocarbons is the change in propionic acid content in the rumen fluids. An increase in the propionic acid content in the rumen fluid indicates that a desirable response in overall ruminant performance has been brought about by the cyclic hydrocarbons in the feed compositions. These in vitro observations have been confirmed by in vivo test methods in which rumen fluids are analyzed at the end of several days (modified in vivo procedure) and by long-term in vivo feeding of ruminants over several months in which weight gain and feed efficiency are measured.

In the examples of the present invention which follow, evaluation of the cyclic hydrocarbons is made by the modified in vivo procedure. The in vivo rumen fluids are analyzed by a gas chromatographic procedure to determine the change of propionic acid content therein. The change in propionic acid content is expressed as percent of the propionic acid content found in the control rumen fluid.

The following example, in which parts and percent are expressed by weight unless otherwise indicated, further illustrate the advantages of this invention.

Example

Four groups of sheep were fed a conventional feed composition containing about 0.05% of cyclic hydrocarbon additive. As a control, an additional group of sheep received the same feed composition but without a cyclic hydrocarbon additive. At the end of seven days of feeding, the rumen fluids were analyzed for propionic acid content by gas chromotography. Results and further details are given below in Table I.

TABLE I

| Compound: | Propionic acid content of rumen fluid, percent of control |
|---|---|
| Cyclooctane | 140 |
| Cyclododecene | 185 |
| 1,5-cyclooctadiene | 190 |
| 1,5,9-cyclododecatriene | 195 |

Representative cyclic hydrocarbons which are useful in the compositions and methods of this invention include:

Cyclohexane, cycloheptane, cyclooctane, cyclononane, cyclodecane, cycloundecane, cyclododecane, cyclotridecane, cyclotetradecane, cyclopentadecane, cyclohexadecane, cycloheptadecane, cyclooctadecane, 1,3-cyclohexadiene, 1,5-cyclooctadiene, 1,5-cyclododecadiene, 1,6-cyclotetradecadiene, 1,10-cyclooctadecadiene, 1,5,9-cyclododecatriene, 1,6,12-cyclohexadecatriene, 1,5,9,13-cyclohexadecatetriene, cyclohexene, cycloheptene, cyclooctene, cyclononene, cyclodecene, cycloundecene, cyclododecene, cyclotridecene, cyclotetradecene, cyclopentadecene, cyclohexadecene, cycloheptadecene, cyclooctadecene.

The cyclic hydrocarbons useful in this invention are incorporated in animal feed compositions in an effective amount over a wide range of concentrations. Significant animal responses are obtained with feed compositions containing from about 0.0001% by weight to about 0.1% by weight of cyclic hydrocarbon. Preferably, the feed compositions contain from about 0.0005% by weight to about 0.05% by weight of cyclic hydrocarbon.

Based on a fattening lamb consuming about 3 pounds of ration per day and cattle each consuming about 20 pounds of ration per day, the cyclic hydrocarbons are administered to sheep in an amount from about 0.0013 gm. to about 1.3 gm. per head per day, and to cattle in an amount from about 0.009 gm. to about 9.0 gm. per head per day. The cyclic hydrocarbons are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed.

The oral administration of cyclic hydrocarbons in accordance with this invention can be accomplished in the form of tablets, capsules, powders, solutions, suspensions or in admixture with one or more components of the animal's diet. Alternatively, the cyclic hydrocarbons can be administered in a equivalent amount in the animal's drinking water.

Conventional ruminant feed rations generally comprise at least about 2 percent plant ingredients such as hay, straw, silage, yellow corn, pasturage, ground corn cobs, cottonseed hulls, cotton mill wastes, beet pulp, corn meal, soybean meal, wheat bran, wheat middlings, dehydrated alfalfa, ground oats, millet, linseed meal, coconut meal, distillers, dried grains, peanut meal, cottonseed meal and the like plant products. Most ruminant feed rations also contain up to about 2 percent mineral ingredients such as bone meal, limestone, salt (NaCl) and the various trace minerals including salts of zinc, copper, maganese, cobalt, iodine, iron and the like. Other materials which can be incorporated into ruminant feed rations in varying amounts include animal ingredients such as fish meal, meat and bone scraps, dried milk, animal fats, dried whey solubles and the like; vitaminaceous ingredients such as vitamins A, $B_{12}$, D and K, as well as the B vitamins such as riboflavin, niacin, pantothenic acid or salts thereof, choline, pyridoxine, thiamine, nicotinic acid or salts thereof, biotin, folic acid and the like; amino acids such as methionine, phenylalanine, arginine, glycine, histidine, isoleucine, leucine, lysine, threonine, tryptophan, valine and the like; medicaments such as antibiotics, hormones and hormone simulators, steroids, arsenicals, anthelmintics and the like; and antioxidants, for example 6-ethoxy - 2,2,4-trimethyl-1,2-dihydroquinoline, butylated hydroxy anisol, butylated hydroxy toluene, 4,4-bis(2,6-di-t-butyl phenol), gamma-tocopherol, esters of gallic acid, and the like.

The feed compositions of this invention can be prepared by incorporating the cyclic hydrocarbons in various ways into any or all components of conventional diets for the type of animal in question. The cyclic hydrocarbons can be added to the diet rations as the pure compounds, as a stabilized concentrate wherein the cyclic hydrocarbons are coated with a protective material such as gelatine or gelatine and sugar, as an adsorbate on silica gel, oatmeal, soybean meal, ion-exchange resins, as a simple admixture with a diluent such as cereal meal, and oil meal and stabilizers, or in solution or emulsion in a vegetable oil such as peanut oil, soybean oil, sesame oil, and the like and preferably including a stabilizer. An oil solution or emulsion lends itself to spraying on the basal ration. Alternatively, the cyclic hydrocarbons can be mixed with other feed additives such as vitamins, antibiotics, hormones, steroids, minerals and other materials of this nature in a feed supplement which is supplied to grain mills or to feed manufacturers who then incorporate it into the finished diet to be supplied to the animals by the farmer. Blending of such materials can be accomplished in the usual type apparatus used for the preparation of dry feed products. For young animals the cyclic hydrocarbons can be incorporated into liquid or semi-liquid feeds or mashes in the form of a suspension or dispersion of the active material. An emulsion or dispersion in peanut oil, soybean oil, and the like can be prepared and these are particularly adapted for liquid compositions including drinking water. The cyclic hydrocarbons also can be administered to the animals subcutaneously or intramuscularly in the form of solutions, pastes or pellets, but it is generally more convenient to use the active material in the animals' feed composition.

Although the invention is described with respect to specific modifications, the details thereof are not to be construed as limitations.

The embodiments of the invention in which an exclusive property or privilege is claimed are defined as follows:

1. A method of promoting the growth of animals selected from the group consisting of poultry, swine and ruminants which comprises feeding said animals a feed composition comprising a feed for said animal and a growth-promoting amount of from about 0.0001% to about 0.1% by weight of a compound selected from the group consisting of saturated and mono- and polyolefinically unsaturated monocycloaliphatic hydrocarbons of at least 6 and not more than 20 carbon atoms.

2. The method of claim 1 wherein the animal is a ruminant.

3. The method of claim 1 wherein the compound is a saturated monocycloaliphatic hydrocarbon.

4. The method of claim 1 wherein the compound is an unsaturated monocycloaliphatic hydrocarbon.

5. The method of claim 1 wherein the compound is cyclooctane.

6. The method of claim 1 wherein the compound is cyclododecene.

7. The method of claim 1 wherein the compound is 1,5-cyclooctadiene.

8. The method of claim 1 wherein the compound is 1,5,9-cyclododecatriene.

9. A feed composition for an animal selected from the group consisting of poultry, swine and ruminants comprising a feed for said animal and a growth-promoting amount of from about 0.0001% to about 0.1% by weight of a compound selected from the group consisting of saturated and mono- and polyolefinically unsaturated monocycloaliphatic hydrocarbons of at least 6 and not more than 20 carbon atoms.

10. The composition of claim 9 wherein the compound is a saturated monocycloaliphatic hydrocarbon.

11. The composition of claim 9 wherein the compound is an unsaturated monocycloaliphatic hydrocarbon.

UNITED STATES PATENTS

| | | | |
|---|---|---|---|
| 2,864,735 | 12/1958 | Stansbury et al. | 424—356 |
| 3,400,166 | 9/1968 | McAlister | 260—666 |
| 3,418,386 | 12/1968 | Hayes | 260—666 |

OTHER REFERENCES

The Merck Index, 7th ed., Merck & Co., Rahway, N.J. (1960), pp. 129, 309–310.

ALBERT T. MEYERS, Primary Examiner

F. E. WADDELL, Assistant Examiner